(12) United States Patent
Pulter et al.

(10) Patent No.: US 10,729,992 B2
(45) Date of Patent: Aug. 4, 2020

(54) CENTRIFUGAL SEPARATOR

(71) Applicant: PRATT & WHITNEY CANADA CORP., Longueuil (CA)

(72) Inventors: Filip Pulter, Rzeszow (PL); Krystian Mazur, Rzeszow (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 299 days.

(21) Appl. No.: 15/687,901

(22) Filed: Aug. 28, 2017

(65) Prior Publication Data

US 2018/0119617 A1 May 3, 2018

(30) Foreign Application Priority Data

Oct. 31, 2016 (EP) ..................... 16461566

(51) Int. Cl.
*B01D 19/00* (2006.01)
*B01D 45/14* (2006.01)
(Continued)

(52) U.S. Cl.
CPC ..... *B01D 19/0057* (2013.01); *B01D 19/0026* (2013.01); *B01D 19/0052* (2013.01); *B01D 45/14* (2013.01); *B04B 5/12* (2013.01); *B04B 9/06* (2013.01); *B04B 9/12* (2013.01); *F02C 7/06* (2013.01); *F05D 2260/98* (2013.01)

(58) Field of Classification Search
CPC .... F01D 25/18; F16N 2210/02; F16N 39/002; F05D 2260/98; F05D 2260/609; F05D 2210/132; B01D 19/0026; B01D 19/0052; B01D 19/0057; B01D 19/0094; B01D 45/14; B01D 45/12; B04B 5/005; B04B 5/12; B04B 2005/12; B04B 9/06; B04B 11/02
See application file for complete search history.

(56) References Cited

U.S. PATENT DOCUMENTS 2,127,746 A * 8/1938 Logan ................... B01D 45/14
55/403
3,415,383 A 12/1968 Earle, Jr. et al.
(Continued)

FOREIGN PATENT DOCUMENTS

DE 10338770 A1 3/2005
SU 939386 A2 6/1982
(Continued)

*Primary Examiner* — Gerald L Sung
*Assistant Examiner* — Stephanie Cheng
(74) *Attorney, Agent, or Firm* — Norton Rose Fulbright Canada LLP

(57) ABSTRACT

A centrifugal separator for separating gas and liquid from a gas-liquid mixture, the centrifugal separator comprising: a housing having a cavity and a gas-liquid mixture inlet leading tangentially into the cavity along an inlet path to form a vortex therein, a separated gas outlet and a separated liquid outlet; and a rotor rotatably mounted to the housing inside the cavity in a manner to be freely rotatable around a rotation axis, the rotor having a hub extending axially along said axis, the rotor having a plurality of vanes extending radially from the hub inside the cavity, the vanes being disposed in the inlet path in a manner so that the rotor is rotated by the gas-liquid mixture during use.

18 Claims, 5 Drawing Sheets

(51) Int. Cl.
 B04B 9/06 (2006.01)
 B04B 9/12 (2006.01)
 F02C 7/06 (2006.01)
 B04B 5/12 (2006.01)

(56) References Cited

U.S. PATENT DOCUMENTS

| | | | |
|---|---|---|---|
| 3,712,032 A | | 1/1973 | Obligado |
| 3,722,212 A | * | 3/1973 | Stein .................. F02C 7/14 60/39.08 |
| 4,217,120 A | | 8/1980 | Reynolds |
| 4,690,759 A | * | 9/1987 | Mandy .................. B01D 45/14 210/304 |
| 5,257,903 A | | 11/1993 | Allmon et al. |
| 2016/0138444 A1 | | 5/2016 | Prunera-Usach et al. |
| 2016/0305440 A1 | | 10/2016 | Laboda et al. |

FOREIGN PATENT DOCUMENTS

| | | |
|---|---|---|
| WO | 2008116239 A1 | 3/2008 |
| WO | 2012009159 A2 | 1/2012 |

\* cited by examiner the engine, such as in the oil supply system 20, the scavenging system 24, or in both.

CENTRIFUGAL SEPARATOR

TECHNICAL FIELD

The application relates generally to separators used to separate gas from liquid of a gas-liquid mixture, and, more particularly, to a separator of the centrifugal/vortex type.

BACKGROUND OF THE ART

Gas-liquid separators, also referred to as deaerators, are devices used to separate gas from a liquid. In the context of a gas turbine engine, they can be used to separate air from scavenged oil for instance.

Centrifugal separators typically involve the formation of a vortex within a cylindrical cavity. Given the presence of the vortex, the denser liquid tends to migrate towards the wall of the cavity, whereas the gas migrates towards the center of the cavity, from where it can be extracted.

In the field of gas turbine engines, it was known to provide separators having rotating blades within a gearbox environment. The rotation of the rotating blades was driven mechanically by another rotating component associated with the gearbox of the gas turbine engine, via meshed gear engagement.

Former centrifugal separators have been satisfactory to a certain degree, but there remains room for improvement.

SUMMARY

In one aspect, there is provided a centrifugal separator for separating gas and liquid from a gas-liquid mixture comprising: a housing having a cavity and a gas-liquid mixture inlet leading tangentially into the cavity along an inlet path to form a vortex therein, a separated gas outlet and a separated liquid outlet; and a rotor rotatably mounted to the housing inside the cavity in a manner to be freely rotatable around a rotation axis, the rotor having a hub extending axially along said axis, the rotor having a plurality of vanes extending radially from the hub inside the cavity, the vanes being disposed in the inlet path in a manner so that the rotor is rotated by the gas-liquid mixture during use.

In another aspect, there is provided a gas turbine engine comprising in serial flow a compressor for pressurizing the air, a combustor in which the compressed air is mixed with fuel and ignited for generating an annular stream of hot combustion gases, and a turbine for extracting energy from the combustion gases, said compressor and said turbine being rotatably mounted to a case via bearings, an oil source, an oil supply system for feeding oil from the oil source to said bearings during use, a scavenging system for scavenging used oil from the bearings during use, the scavenging system having a scavenge pump, and a centrifugal separator having: a housing having a cavity and an air-oil mixture inlet leading tangentially into the cavity along an inlet path to form a vortex therein, and a separated oil outlet, said air-oil mixture inlet being connected to receive used oil from the scavenging system, and a rotor rotatably mounted to the housing inside the cavity in a manner to be freely rotatable around a rotation axis, the rotor having a hub extending axially along said axis, the rotor having a plurality of vanes extending radially from the hub inside the cavity, the vanes being disposed in the inlet path in a manner so that the rotor is rotated by the gas-liquid mixture during use.

In a further aspect, there is provided a method of operating a deaerator, said deaerator having a housing with an inlet leading tangentially into a vortex cavity, a rotor rotatably mounted to the housing and extending within the vortex cavity, a gas outlet and a liquid outlet, said method comprising: feeding a gas-liquid mixture into the vortex cavity via the inlet at a flow rate and velocity adapted to impart and sustain the rotation of said rotor and generate a vortex within said vortex cavity.

DESCRIPTION OF THE DRAWINGS

Reference is now made to the accompanying figures in which.

DETAILED DESCRIPTION

Figure 1:
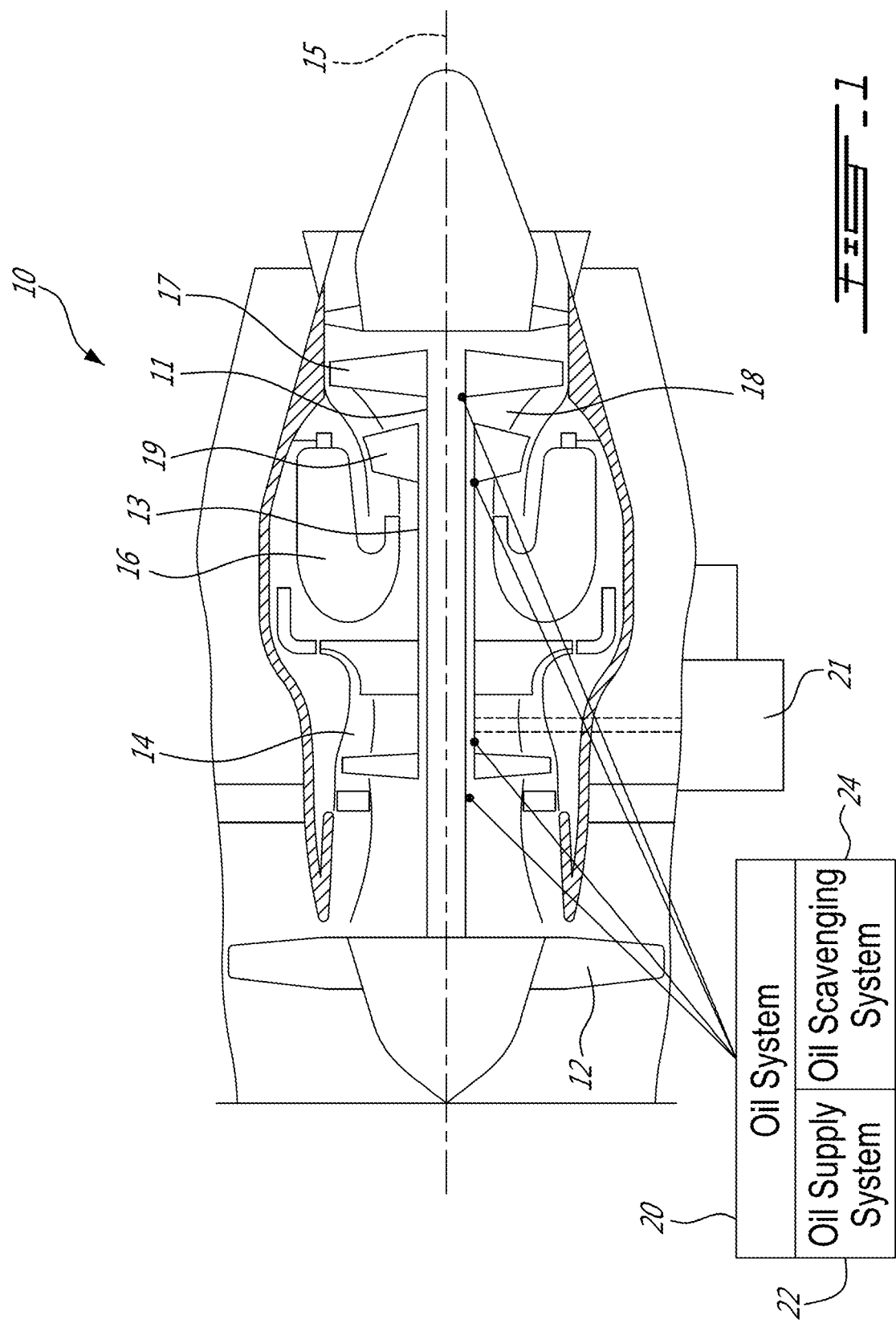
FIG. 1 is a schematic cross-sectional view of a gas turbine engine.

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Gas turbine engines use a significant amount of oil to lubricate the many bearings used between the casing and rotary components, and typical gas turbine engines require a system to scavenge and recycle the oil after each use. The recycling of the oil involves the separation of the air from the scavenged air-oil mixture with a device known as a separator or deaerator. It was known to provide separators having rotating blades within a gearbox environment. The rotation of the rotating blades was driven mechanically by a rotary component of the gearbox, via meshed gear engagement.

For instance, in the gas turbine engine depicted in FIG. 1, the turbine section 18 comprises a low pressure turbine 17 and a high pressure turbine 19. The engine 10 also has two rotating main engine shafts, namely a first inner shaft 11 interconnecting the fan 12 with the low pressure turbine 17, and a second outer shaft 13 interconnecting the compressor section 14 with the high pressure turbine 19. The inner and outer main engine shafts 11 and 13 are concentric and rotate about the centerline axis 15 which is collinear with their longitudinal axes. In this embodiment, the gas turbine engine 10 has a gearbox 21 connected to one of the main engine shafts 11, 13 of the engine such as is well known to people of ordinary skill in the art.

The main engine shafts 11, 13 extend through several engine cavities where they are rotatably mounted via bearings. The gas turbine engine 10 includes an oil system 20 for circulating cooling and lubricant oil within the engine. The oil system 20 includes an oil supply system 22 for delivering oil from a source such as an oil tank to various locations in the engine, such as the bearing cavities. The oil system 20 further includes an oil scavenging system 24 for recovering used oil at those various locations within the engine, and discharging the recovered used oil back into the source. One or more pumps are typically used to circulate the oil within the oil system 20. In this context, for instance, it can be useful, or even required, to use a separator as part of the oil system 20 to separate air collected by the oil during lubrication and cooling out from the scavenged air-oil mixture. Such a separator can be provided in the oil tank, for instance, or otherwise connected with a separated oil outlet leading into the oil tank. The air-oil mixture inlet of such a separator can be connected in a manner to receive the air-oil mixture from a scavenge pump of the oil scavenging system 24, for instance.

FIGS. 2 to 5 show an example of a separator 25, or components thereof. The separator 25 can be used in a gas turbine engine, for instance, or in another context.

Figure 2:
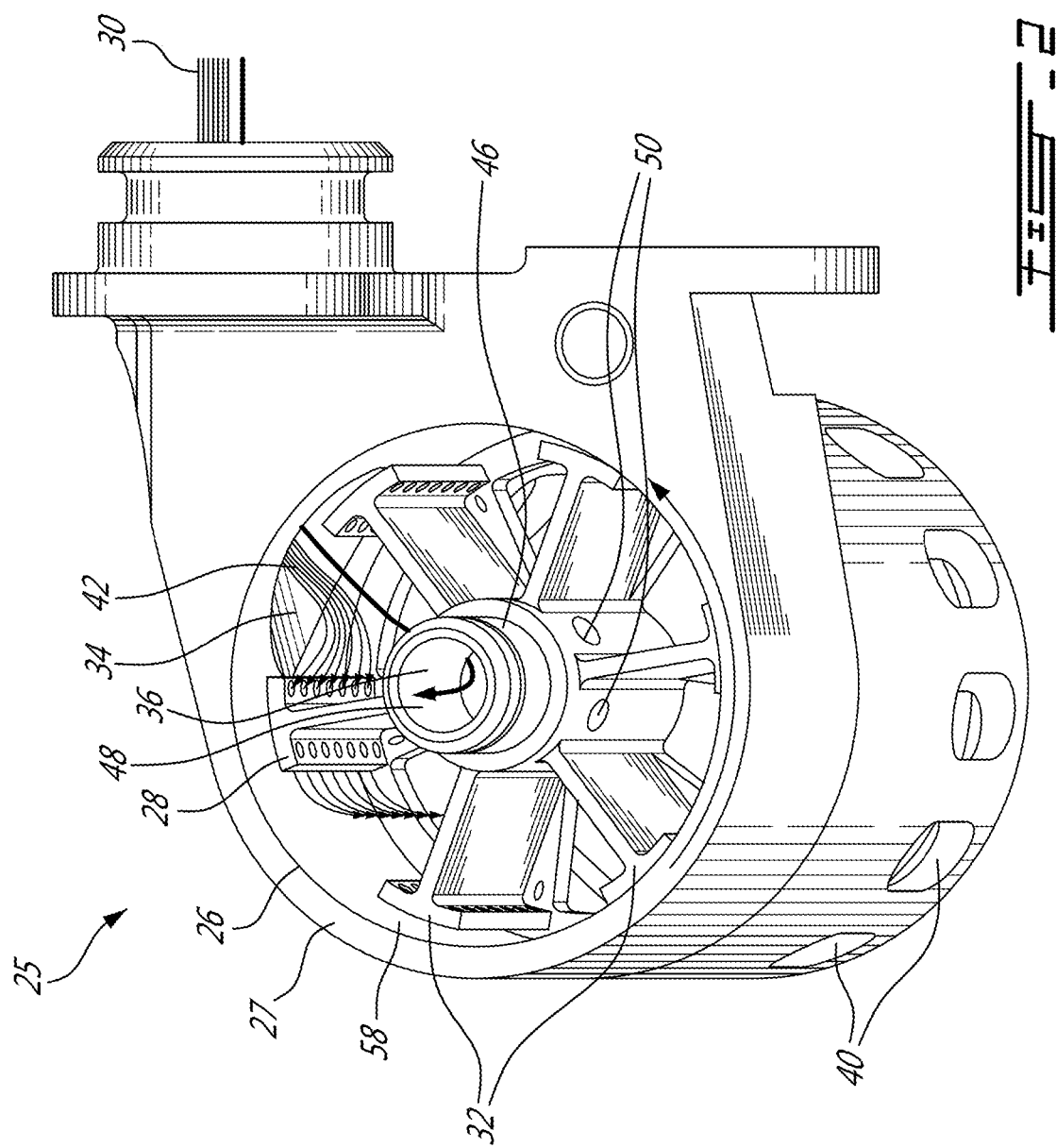
FIG. 2 is an oblique view of a separator, with a cover removed.
Figure 3:
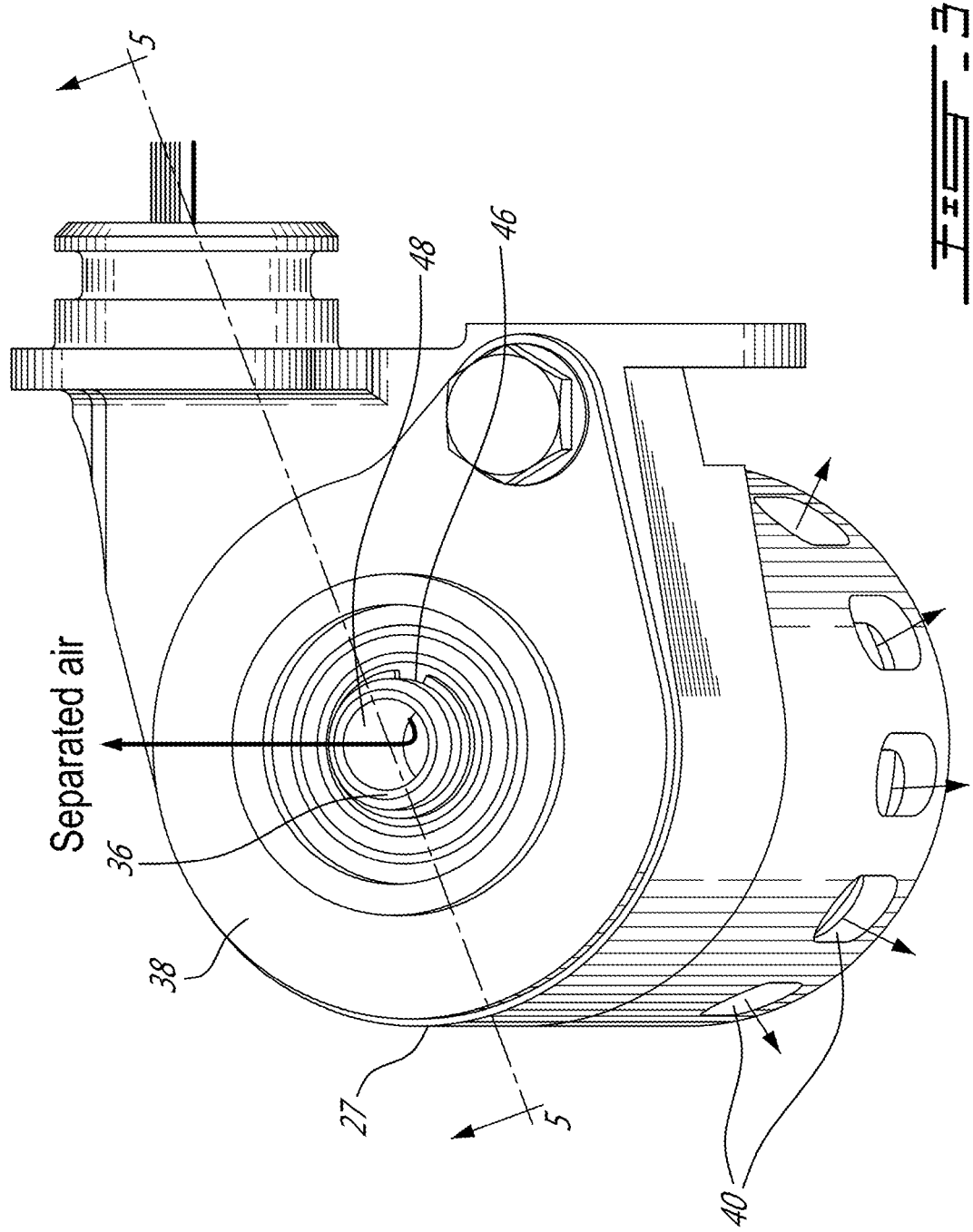
FIG. 3 is an oblique view of the separator of FIG. 2, with the cover.
Figure 5:
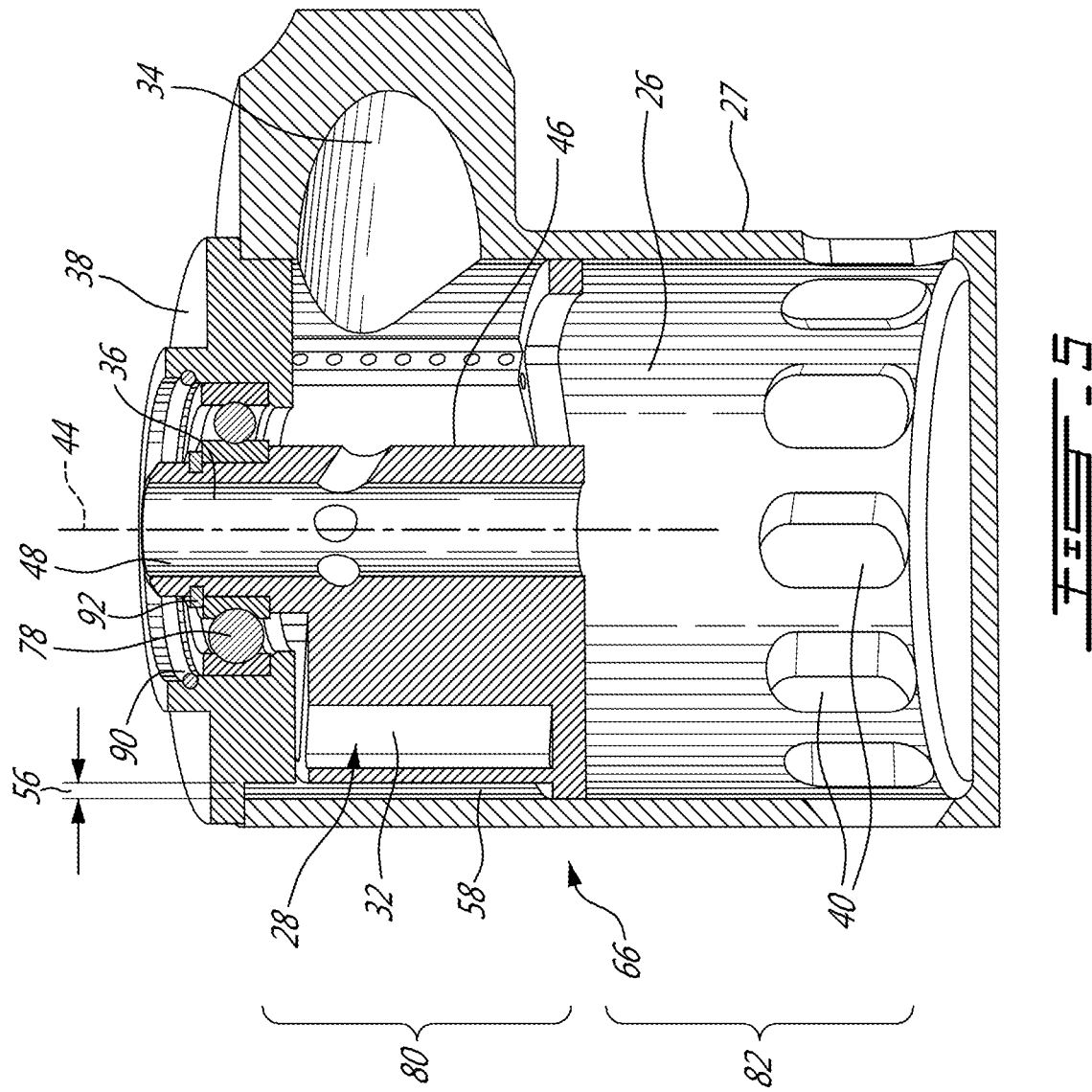
FIG. 5 is a cross-sectional view of a separator taken along cross-section lines 5-5 of FIG. 3.

Referring to FIG. 2, the separator 25 has a housing 27 with an internal cavity 26. The separator 25 is a centrifugal separator 25 in the sense that it is configured to sustain a vortex flow of fluid in the internal cavity 26 during use. In FIG. 2, a cover 38 of the separator 25, shown in FIGS. 3 and 5, is removed to show the internal cavity 26 and internal components; and annotations are used to illustrate movement during use. The centrifugal separator 25 has a rotor 28 which acts as a turbine or windmill and is driven into rotation by the velocity of the gas-liquid mixture 30 being fed therein, independently of any other external force. Accordingly, the centrifugal separator 25 does not require a motor nor any external driving force other than the velocity of the gas-liquid mixture to drive the rotor into rotation. This can enable the use of the separator in contexts where such external components would not be readily available, which can be the case in at least some embodiments where the separator is used as part of an oil scavenging system.

Figure 4:
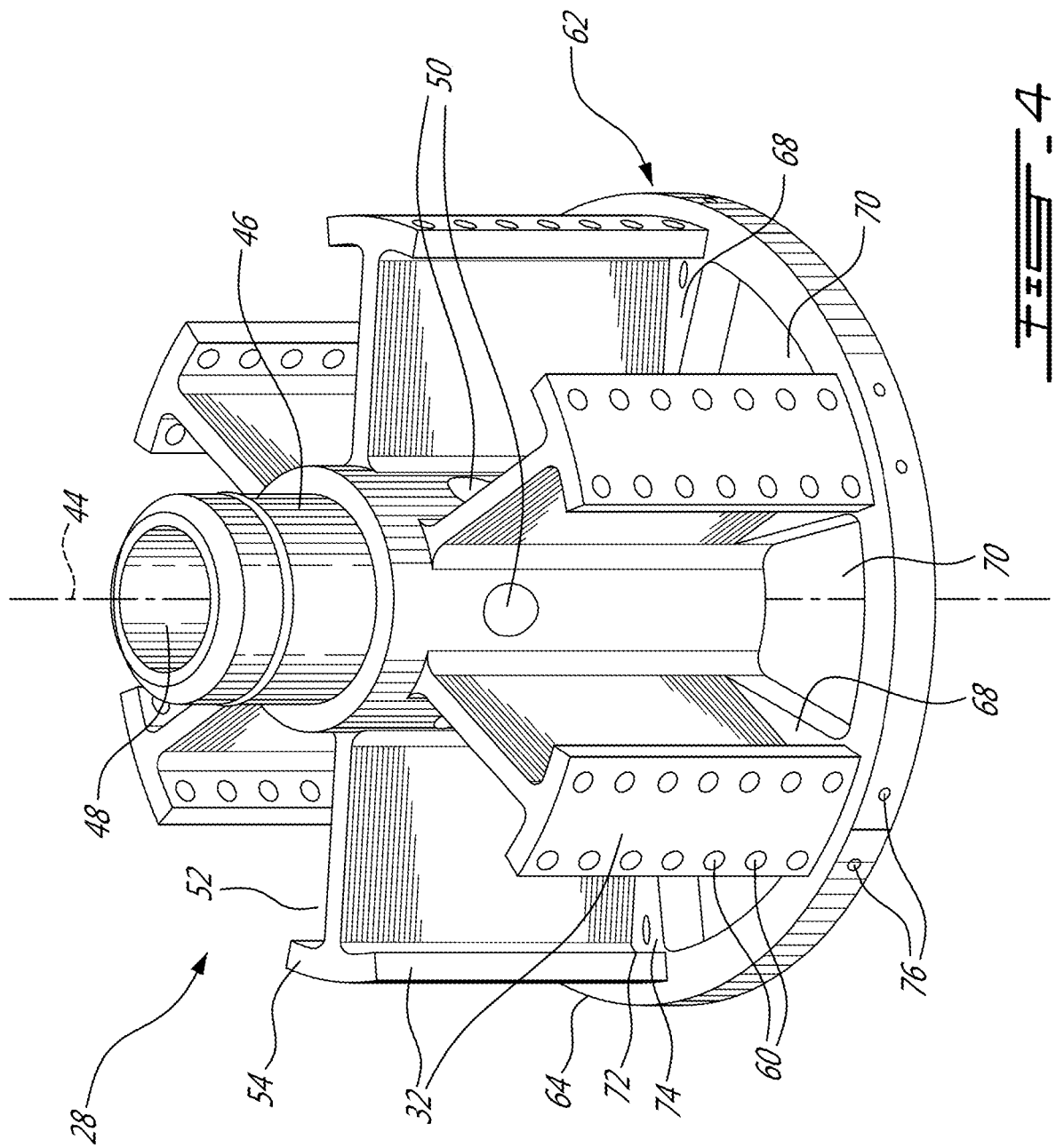
FIG. 4 is an oblique view of an impeller of the separator of FIG. 2.

The rotor 28, shown alone in FIG. 4, has vanes 32. The vanes 32 of the rotor 28 can be designed in a manner to balance two functions. The first one of these functions is to capture the energy from the velocity of the fluid to drive the rotation of the rotor 28. The second one of these functions is to improve the gas-liquid separation efficiency. Indeed, during use, the rotating separator can help the process of centrifugal separation of the radially-outwardly driven heavier liquid from the radially-inwardly driven lighter gas. The rotating central surfaces provided by the vanes 32 can be used to increase surface of contact and increase dwell time, and thus improve efficiency.

In FIG. 2, a cover of the separator is removed to show the rotor 28 in the cavity 26. The rotor 28 is rotatably mounted to the housing 27, and more specifically extends within the cavity 26 of the housing 27. The cavity 26 can be referred to as a vortex cavity since it is shaped in a manner to favour the formation of a vortex therein. In this embodiment, the vortex cavity 26 has a cylindrical shape to this end, but it can alternately have another solid-of-revolution shape such as a truncated conical shape, for instance. The housing 27 has a gas-liquid mixture inlet 34 leading tangentially into the cavity 26, a gas outlet 36, and a liquid outlet 40. The separator is designed to receive the gas-liquid mixture from the inlet 34 at a given velocity. The velocity can be imparted by a difference of pressure between the inlets and the outlets. A pump can be used upstream of the separator to drive the desired velocity of fluid in some embodiments. The path along which the gas-liquid mixture enters the cavity via the inlet can be referred to as the inlet path 42, and is designed to generate a vortex in the cavity 26. The gas-liquid mixture inlet 34 can be provided in the form of a tangential fluid port across which the fluid can penetrate the cavity 26 at a relatively high velocity to drive the rotor into rotation via its engagement with its vanes 32.

The rotor 28 is rotatably mounted to the housing 27 in a manner to be freely rotatable therein, around a rotation axis 44 which coincides with the axis of the cavity. The rotor 28 has a hub 46 extending axially, and the vanes 32 extend radially from the hub 46 inside the cavity 26. The vanes 32 extend in the inlet path 42, in a manner for the gas-liquid mixture 30 to impinge thereon and drive the rotor 28 into rotation during use. Accordingly, the rotor is rotatably mounted to the housing 27 in a manner to be drivable into rotation by the velocity of the gas-liquid mixture 30 during use. The hub 46 has an internal gas passage 48 extending axially therein. The gas passage 48 communicates with the cavity 26, via a plurality of apertures 50 provided across a cylindrical wall of the hub 46, to receive separated gas therefrom. In this embodiment, the gas passage 48 guides the separated air out the gas outlet 36. More specifically in this embodiment, the gas outlet 36 is at a first end of the housing 27, as shown in FIG. 3, and the liquid outlet 40 is provided in the form of a plurality of circumferentially-interspaced apertures located at an opposite, second end of the housing.

Referring to FIG. 4, in this embodiment, the vanes 32 can generally be seen to have a radial panel 52 extending radially outwardly from the hub 46. The vanes 32 also have a circumferential panel 54 extending transversally relative to the radial panels 52, in the circumferential orientation, and being provided at a radially-distal end of the corresponding radial panel 52. The circumferential panels 54 extend circumferentially over a certain distance on both circumferential sides of the radial panel. As shown in FIGS. 2 and 5, the circumferential panels 54 are spaced from the cylindrical wall of the cavity 26 by a given distance 56. Accordingly, an annular spacing 58 is provided between the circumferential panels 54 and the cylindrical wall of the cavity 26. In this embodiment, the circumferential panels 54 are provided with a series of axially interspaced through apertures 60 on each circumferential side of the radial panel 52, which allows radial fluid flow communication across the circumferential panels 54. The vanes 32 can be understood to form a generally T-shaped cross-section taken in a radially-extending plane.

Referring to FIG. 4, the rotor 28 in this embodiment is also provided with a radially-extending disc 62 extending at an end of the vanes 32. The design of this disc 62 is specific to applications where the liquid to be separated from the gas is a lubricating liquid such as oil. The disc 62 has a journal 64 at its periphery, the journal 64 being designed to be engaged with a corresponding portion of the housing 27 and to form a journal bearing 66 therewith such as shown in FIGS. 2 and 5. The journal bearing 66 is lubricated by the lubricating liquid. In this embodiment, the disc 62 has a plurality of members which will be referred to herein as spokes 68 and which extend radially between the hub 46 and the journal 64. The disc 62 has a plurality of apertures 70 being circumferentially interspersed with the plurality of spokes, i.e. corresponding apertures 70 are provided between two corresponding ones of the spokes 68. The apertures 70 collectively provide fluid flow communication in the axial orientation. Referring back to FIG. 2, during use, the separated liquid migrates deeper into the cavity 26, across the apertures 70, and out the liquid outlet 40. Some of the liquid naturally migrates into the journal bearing 66 to lubricate it. In this embodiment, additional journal bearing feed conduits are used in order to further contribute to the lubrication of the journal bearing 66. More specifically, the spokes 68, provided as flat members extending in a radial plane of the disc 62, are circumferentially broader than the radial panels 52 of the vanes 32, and each forms an axial termination to a corresponding one of the radial panels 52. A three-sided internal corner 72 is formed at the intersection between the radial panel 52, spoke 68, and circumferential panel 54. To a certain extent, the three-sided corner 72 forms a pocket where oil tends to form a certain amount of accumulation during use. In the illustrated embodiment, this feature is harnessed by providing an inlet 74 of the journal bearing feed conduits proximate to this corner. In the illustrated embodiment, the inlet 74 is more specifically provided in a face of the spoke 68 which faces the radial and circumferential panels 52, 54. An outlet 76 of the journal bearing feed conduits are provided on a radially outer face of the journal 64, and additional lubricating liquid is conveyed by the feed conduits and form the oil film.

Referring now to FIG. 5, it can be seen that in this embodiment, the rotor 28 is secured to the housing 27 via an additional bearing, more specifically a ball bearing 78 provided between a first end of the hub 46 and the cover 38 of the housing 27. The ball bearing 78 sits in the gas outlet 36 of the separator 25, and the gas passage 48 guides the separated gas across the gas outlet 36, within a central aperture of the ball bearing 78. The rotor 28 can be seen to extend almost entirely into the cavity, within a portion of the cavity which will be referred to herein as the rotor portion 80. The gas-liquid mixture inlet 34 is provided at the rotor portion 80 of the cavity, and oriented tangentially for the gas-liquid mixture to impinge upon the radial panels 52 of the vanes 32. The separated liquid outlet 40 is at a second portion 82 of the cavity, opposite the rotor portion 80. More specifically, the gas-liquid mixture inlet 34 can be said to be at a first end of the cavity 26, and the separated liquid outlet 40 can be said to be at a second, opposite end of the cavity 26. The disc 62 of the rotor 28, and more specifically the journal 64, is at an intermediary axial location in the cavity 26, between the first end and the second end. The gas passage 48 inside the hub 46 can be seed to have a plurality of apertures 50 providing radial fluid flow communication across a cylindrical wall of the hub, allowing separated air to escape from to the areas between the radial panels to the gas outlet 36 via the apertures 50. In this embodiment, the hub 46 is open at both ends, and the gas passage 48 can thus receive gas from the second portion 82 of the cavity 26. During assembly, the rotor 28 can be axially inserted into the cavity 26 via the first end when the cover 38 is removed, and can be axially held in the rotor portion 80 of the cavity 26 by retaining rings 90, 92 which hold the hub 46, ball bearing 78, and cover together 38.

When used in the context of a gas turbine engine, the velocity of the incoming air-oil mixture can be driven by the scavenge pump and the differential pressure it maintains between the inlet and outlets. The air-oil mixture is fed into the vortex cavity via the inlet at a flow rate and velocity adapted to impart and sustain the rotation of the rotor and generate a vortex within said vortex cavity. More specifically, the gas-liquid mixture can impinge against the vanes of the rotor. The vortex, together with the impinging action of the newly introduced fluid, cooperate in separating the gas from the liquid. A pressure differential can be maintained between the vortex cavity and the gas outlet in a manner to pump the separated gas out from the gas outlet.

The above description is meant to be exemplary only, and one skilled in the art will recognize that changes may be made to the embodiments described without departing from the scope of the invention disclosed. For example, the centrifugal separator can be also used to separate air from oil in other industries, or even to separate other gas-liquid combinations than oil and gas. Such other industries can include the oil and gas industry, the food and drug industry, or any other industry where there is a need to separate liquid from gas and where the teachings of this specification can be of use. Still other modifications which fall within the scope of the present invention will be apparent to those skilled in the art, in light of a review of this disclosure, and such modifications are intended to fall within the appended claims.

The invention claimed is:

1. A gas turbine engine comprising in serial flow a compressor for compressing air, a combustor in which the compressed air is mixed with fuel and ignited for generating an annular stream of hot combustion gases, and a turbine for extracting energy from the combustion gases, said compressor and said turbine being rotatably mounted to a case via bearings; the gas turbine engine further comprising, an oil source, an oil supply system for feeding oil from the oil source to said bearings during use, and a scavenging system for scavenging used oil from the bearings during use; the scavenging system having a scavenge pump, and a centrifugal separator having a housing having a central axis, a cavity, a gas-liquid mixture inlet leading tangentially into the cavity at a circumference of the housing to form a vortex therein, a separated gas outlet, and a separated liquid outlet; the centrifugal separator further having a rotor rotatably mounted within the housing in a manner to be freely rotatable around the central axis of the housing, the rotor having a hub extending axially, and a plurality of vanes extending radially from the hub inside the cavity in a manner for the rotor to be drivable into rotation by the velocity of the gas-liquid mixture during use, the plurality of vanes having radial panels leading radially-outwardly from the hub to circumferential panels, the radial panels and circumferential panels extending axially along the hub, and the plurality of vanes forming T-shaped cross-sections in a plane transverse to the central axis, wherein the gas-liquid mixture inlet is connected to receive used oil from the scavenging system.

2. The gas turbine engine of claim 1 wherein a first end of the hub is mounted to a corresponding end of the housing via a ball bearing, the separated gas outlet being provided across the ball bearing, the hub further having an internal gas passage extending axially therein, the internal gas passage communicating with the cavity to receive separated gas therefrom and guiding the separated gas through the separated gas outlet across the ball bearing.

3. The gas turbine engine of claim 1 wherein the cavity is cylindrical, the plurality of vanes extend along a rotor portion of the cavity, the gas-liquid mixture inlet being at a first end of the cavity, in the rotor portion, the separated liquid outlet being at a second end of the cavity, opposite the first end.

4. The gas turbine engine of claim 3 wherein the separated liquid outlet has a plurality of apertures extending radially across the housing.

5. The gas turbine engine of claim 3 wherein the rotor has a radially-extending disc at an intermediary axial location between the first end of the cavity and the second end of the cavity, the disc having a journal at a periphery thereof, the journal being engaged with a corresponding portion of the housing and forming a journal bearing therewith.

6. The gas turbine engine of claim 5 wherein the disc has a plurality of spokes extending radially between the hub and the journal, and a plurality of apertures circumferentially interspaced between corresponding ones of the plurality of spokes, the plurality of apertures allowing axial fluid flow communication across the disc.

7. A centrifugal separator for separating gas and liquid from a gas-liquid mixture comprising:
a housing having a central axis, a cavity, a gas-liquid mixture inlet leading tangentially into the cavity at a circumference of the housing to form a vortex therein, a separated gas outlet, and a separated liquid outlet;
a rotor rotatably mounted to within the housing in a manner to be freely rotatable around the central axis of the housing, the rotor having a hub extending axially, and a plurality of vanes extending radially from the hub inside the cavity in a manner for the rotor to be drivable into rotation by the velocity of the gas-liquid mixture during use, wherein the plurality of vanes have radial panels leading radially-outwardly from the hub to circumferential panels, the radial panels and circumferential panels extending axially along the hub, and the plurality of vanes forming T-shaped cross-sections in a plane transverse to the central axis.

8. The centrifugal separator of claim 7 wherein a first end of the hub is mounted to a corresponding end of the housing via a ball bearing, the separated gas outlet being provided across the ball bearing, the hub further having an internal gas passage extending axially therein, the internal gas passage communicating with the cavity to receive separated gas therefrom and guiding the separated gas through the separated gas outlet across the ball bearing.

9. The centrifugal separator of claim 7 wherein the cavity is cylindrical, the plurality of vanes extend along a rotor portion of the cavity, the gas-liquid mixture inlet being at a first end of the cavity, in the rotor portion, the separated liquid outlet being at a second end of the cavity, opposite the first end of the cavity.

10. The centrifugal separator of claim 9 wherein the separated liquid outlet has a plurality of apertures extending radially across the housing.

11. The centrifugal separator of claim 9 wherein the rotor has a radially-extending disc at an intermediary axial location between the first end of the cavity and the second end of the cavity, the disc having a journal at a periphery thereof, the journal being engaged with a corresponding portion of the housing and forming a journal bearing therewith.

12. The centrifugal separator of claim 11 wherein the disc has a plurality of spokes extending radially between the hub and the journal, and a plurality of apertures circumferentially interspaced between corresponding ones of the plurality of spokes, the plurality of apertures allowing axial fluid flow communication across the disc.

13. The centrifugal separator of claim 12 wherein the plurality of spokes are flat members extending in the plane transverse to the central axis, are circumferentially broader than the plurality of vanes, and each spoke provides axial termination to a corresponding one of the plurality of vanes.

14. The centrifugal separator of claim 13, further comprising a plurality of journal bearing feed conduits each extending from an inlet located in a corresponding one of the plurality of spokes, proximate to both of a corresponding one of the radial panels and a corresponding one of the circumferential panels of the plurality of vanes, to an outlet located on a radially-outer face of the journal.

15. The centrifugal separator of claim 7 further comprising an annular spacing between the housing and the circumferential panels of the plurality of vanes.

16. The centrifugal separator of claim 15 wherein each of the circumferential panels extends circumferentially from two opposite sides of a radially distal end of a corresponding one of the radial panels, and has a plurality of axially distributed through apertures on both of said sides providing radial fluid flow communication across the circumferential panels.

17. A centrifugal separator for separating gas and liquid from a gas-liquid mixture comprising:
a housing having a central axis, a cavity being cylindrical, a gas-liquid mixture inlet leading tangentially into the cavity at a circumference of the housing to form a vortex therein, a separated gas outlet, and a separated liquid outlet, the gas-liquid mixture inlet located at a first end of the cavity, the separated liquid outlet located at a second end of the cavity, opposite the first end of the cavity;
a rotor rotatably mounted within the housing in a manner to be freely rotatable around the central axis, the rotor having a hub extending axially in a rotor portion of the cavity adjacent to the first end of the cavity, and a plurality of vanes extending radially from the hub inside the cavity in a manner for the rotor to be drivable into rotation by the velocity of the gas-liquid mixture during use, the rotor having a radially-extending disc at an intermediary axial location between the first end of the cavity and the second end of the cavity, the disc having a journal at a periphery thereof, the journal engaged with a corresponding portion of the housing and forming a journal bearing therewith.

18. The centrifugal separator of claim 17 wherein the plurality of vanes have radial panels leading radially-outwardly from the hub to circumferential panels, and form T-shaped cross-sections in a plane transverse to the central axis.

* * * * *